(12) United States Patent
van Raam et al.

(10) Patent No.: US 10,238,084 B2
(45) Date of Patent: Mar. 26, 2019

(54) CATTLE FLOOR

(75) Inventors: Carolus Hermanus van Raam, Hoogmade (NL); Andrew Bryan Shuttleworth, Poulton-le Fylde (GB); Paul David Culleton, Warrington (GB)

(73) Assignee: Permavoid Limited, Leicester (GB)

( * ) Notice: Subject to any disclaimer, the term of this patent is extended or adjusted under 35 U.S.C. 154(b) by 0 days.

(21) Appl. No.: 14/424,285

(22) PCT Filed: Sep. 7, 2012

(86) PCT No.: PCT/NL2012/050629
§ 371 (c)(1),
(2), (4) Date: Jun. 2, 2015

(87) PCT Pub. No.: WO2014/038930
PCT Pub. Date: Mar. 13, 2014

(65) Prior Publication Data
US 2015/0334980 A1 Nov. 26, 2015

(51) Int. Cl.
*A01K 1/00* (2006.01)
*A01K 1/01* (2006.01)
(Continued)

(52) U.S. Cl.
CPC .............. *A01K 1/01* (2013.01); *A01K 1/0088* (2013.01); *A01K 1/0151* (2013.01); *B25J 11/0085* (2013.01); *Y10S 901/01* (2013.01)

(58) Field of Classification Search
CPC ........ E01C 13/08; E01C 13/02; E01C 13/083; E01C 9/086; E01C 3/006; E01C 5/22;
(Continued)

(56) References Cited

U.S. PATENT DOCUMENTS

| | | | |
|---|---|---|---|
| 2,460,894 A * | 2/1949 | Martinovich | A01K 1/0128 119/451 |
| 2,874,844 A * | 2/1959 | Wanner | B01D 24/24 210/150 |

(Continued)

FOREIGN PATENT DOCUMENTS

| CN | 101084733 | 12/2007 |
|---|---|---|
| CN | 101111650 | 1/2008 |

(Continued)

OTHER PUBLICATIONS

ISR & Written Opinion dated Oct. 9, 2013, from PCT/EP2013/064245.

(Continued)

*Primary Examiner* — Patrick D Hawn
(74) *Attorney, Agent, or Firm* — Adsero IP

(57) ABSTRACT

Floor for animals such as cattle, comprising a base structure and a top layer, wherein the top layer is permeable to fluid portions of animal faeces and/or animal urine, but impermeable to solid parts of the animal faeces, wherein the base structure comprises voids for receiving said fluid portions and/or urine passing through the top layer, wherein the base structure comprises an array base elements forming a substantially continuous deck supporting the top layer, wherein the deck is arranged for passing said fluids into internal volumes of the base elements forming said voids, the internal volumes of at least a number of said base elements being in fluid communication with each other, preferably such that fluids received in said internal volumes can be removed from the base elements by flow through said internal volumes.

33 Claims, 7 Drawing Sheets

(51) Int. Cl.
*B25J 11/00* (2006.01)
*A01K 1/015* (2006.01)

(58) Field of Classification Search
CPC ....... E01C 5/20; A01K 1/0151; A01K 1/0157; A01K 1/01; A01K 1/0128; A01K 1/0088; B25J 11/0085; Y10S 901/01
USPC ......... 404/29, 34, 35; 428/17; 119/450, 451, 119/479, 525, 526, 527, 528, 530
See application file for complete search history.

(56) References Cited

U.S. PATENT DOCUMENTS

| | | | | |
|---|---|---|---|---|
| 3,215,118 | A * | 11/1965 | Behlen | E04C 2/427 |
| | | | | 119/513 |
| 3,611,997 | A * | 10/1971 | Benno | A01K 1/0151 |
| | | | | 119/51.01 |
| 3,848,568 | A * | 11/1974 | Hazen | A01K 1/0151 |
| | | | | 119/527 |
| 4,176,622 | A * | 12/1979 | Wolf | E04C 2/427 |
| | | | | 119/528 |
| 4,280,447 | A * | 7/1981 | Laurenz | A01K 1/0128 |
| | | | | 119/451 |
| 4,364,331 | A * | 12/1982 | Foenard | A01K 1/0157 |
| | | | | 119/526 |
| 5,218,783 | A | 6/1993 | Langezaal | |
| 5,373,661 | A | 12/1994 | Furukawa | |
| 5,437,698 | A | 8/1995 | Furukawa | |
| 5,724,916 | A * | 3/1998 | Brodie | A01K 1/0157 |
| | | | | 119/525 |
| 5,967,092 | A * | 10/1999 | Pederson | A01K 1/015 |
| | | | | 119/525 |
| 6,237,285 | B1 | 5/2001 | Yoshida | |
| 6,499,433 | B2 * | 12/2002 | Notenbomer | A01C 3/026 |
| | | | | 119/447 |
| 6,511,257 | B1 * | 1/2003 | Seaux | E01C 9/086 |
| | | | | 404/34 |
| 6,606,823 | B1 | 8/2003 | McDonough | |
| 6,694,672 | B1 | 2/2004 | Hergeth | |
| 6,732,666 | B2 | 5/2004 | Layt | |
| 6,779,946 | B1 | 8/2004 | Urriola | |
| 6,898,909 | B2 * | 5/2005 | Sala Prat | E04F 15/08 |
| | | | | 119/450 |
| 7,014,390 | B1 | 3/2006 | Morris | |
| 7,596,906 | B2 | 10/2009 | Gold | |
| 7,603,808 | B2 | 10/2009 | Carpenter | |
| 7,676,987 | B2 * | 3/2010 | Yoshida | A01G 9/02 |
| | | | | 47/1.01 F |
| 7,704,011 | B2 * | 4/2010 | Marshall | E01C 3/006 |
| | | | | 404/29 |
| 7,716,873 | B2 | 5/2010 | Irwin | |
| 7,827,938 | B2 * | 11/2010 | Kuehlmann | A01K 1/0135 |
| | | | | 119/451 |
| 7,914,228 | B2 | 3/2011 | Rapaz | |
| 8,128,312 | B2 * | 3/2012 | Stuchell | E01C 5/223 |
| | | | | 404/43 |
| 8,209,905 | B2 | 7/2012 | Furumura | |
| 8,272,163 | B2 | 9/2012 | Dubner | |
| 8,414,217 | B2 * | 4/2013 | Rosan | E01C 11/24 |
| | | | | 404/35 |
| 8,464,490 | B2 * | 6/2013 | Rapaz | E04C 2/20 |
| | | | | 428/133 |
| 8,479,443 | B2 | 7/2013 | Buist | |
| 8,555,586 | B2 * | 10/2013 | Lowe | E03F 1/005 |
| | | | | 210/170.03 |
| 8,657,695 | B2 * | 2/2014 | Wilson | E01C 3/006 |
| | | | | 472/86 |
| 8,790,037 | B2 | 6/2014 | Culleton | |
| 9,015,992 | B1 | 4/2015 | Livingston | |
| 9,167,743 | B2 | 10/2015 | Li | |
| 9,265,200 | B2 | 2/2016 | Buist | |
| 2003/0186025 | A1 | 10/2003 | Rapaz | |
| 2003/0188505 | A1 * | 10/2003 | Marshall | E01C 3/006 |
| | | | | 52/606 |
| 2005/0042394 | A1 | 2/2005 | Sawyer | |
| 2005/0044791 | A1 | 3/2005 | Morandini | |
| 2005/0076855 | A1 * | 4/2005 | Throndsen | A01K 1/0353 |
| | | | | 119/526 |
| 2006/0045994 | A1 | 3/2006 | Dipple | |
| 2006/0081159 | A1 | 4/2006 | Chapman | |
| 2006/0124074 | A1 * | 6/2006 | Koelker | A01K 1/0157 |
| | | | | 119/526 |
| 2007/0157514 | A1 | 7/2007 | Carpenter | |
| 2008/0149188 | A1 | 6/2008 | Zimmerman | |
| 2008/0236041 | A1 | 10/2008 | Carpenter | |
| 2009/0260284 | A1 | 10/2009 | Barbalho | |
| 2010/0064580 | A1 | 3/2010 | Irwin | |
| 2012/0040767 | A1 | 2/2012 | Wilson | |
| 2012/0163911 | A1 | 6/2012 | Culleton | |
| 2012/0178542 | A1 * | 7/2012 | Culleton | E01C 13/02 |
| | | | | 472/92 |
| 2012/0291714 | A1 * | 11/2012 | Stal | A01K 1/0132 |
| | | | | 119/451 |
| 2012/0321389 | A1 | 12/2012 | Kreikemeier | |
| 2013/0284397 | A1 | 10/2013 | Storm | |
| 2014/0026480 | A1 | 1/2014 | Lenhart | |
| 2014/0059926 | A1 | 3/2014 | Li | |
| 2014/0270945 | A1 | 9/2014 | Bach | |
| 2014/0286704 | A1 | 9/2014 | Bennett | |
| 2017/0030026 | A1 | 2/2017 | Van Raam | |

FOREIGN PATENT DOCUMENTS

| | | |
|---|---|---|
| CN | 100436723 C | 11/2008 |
| CN | 101323510 | 12/2008 |
| CN | 101608491 A | 12/2009 |
| CN | 201460055 U | 5/2010 |
| CN | 201541554 U | 8/2010 |
| CN | 201919461 | 8/2011 |
| CN | 202077460 U | 12/2011 |
| CZ | 22468 | 7/2011 |
| DE | 9207171 U1 | 7/1992 |
| DE | 29610425 U1 | 11/1996 |
| DE | 19911409 A1 | 9/2000 |
| DE | 202011106604 U1 | 11/2011 |
| EP | 0266701 A2 | 5/1988 |
| FR | 2671121 A1 | 7/1992 |
| JP | 06209655 | 8/1994 |
| JP | 200245043 | 2/2002 |
| NL | 1018903 | 3/2003 |
| WO | WO 2002/014608 | 2/2002 |
| WO | WO 2009/030896 | 3/2009 |
| WO | WO 2011/007128 | 1/2011 |
| WO | WO 2012/050529 | 4/2012 |
| WO | WO 2014/006180 | 1/2014 |

OTHER PUBLICATIONS

ISR dated Aug. 2, 2013, from PCT/NL2012/050629.
Office Action from U.S. Appl. No. 14/412,324 dated Aug. 12, 2016.
International Search Report from PCT/EP2015/055032 dated May 1, 2015.
Notice of Allowance from U.S. Appl. No. 14/207,139 dated Oct. 24, 2016.
Office Action from CN Application No. 201280075713.3 dated Mar. 28, 2016.
Office Action from U.S. Appl. No. 14/207,139 dated Apr. 6, 2016.
Office Action and Search Report from CN 201380043173.5 dated Jan. 12, 2016 with English Translation.
Office Action from CN Application No. 201380043173.5 dated Dec. 20, 2016.
Office Action from U.S. Appl. No. 15/124,786 dated Mar. 29, 2017.
Office Action from U.S. Appl. No. 14/412,481 dated May 25, 2017.

* cited by examiner

CATTLE FLOOR

RELATED APPLICATIONS

This application is a 35 U.S.C. § 371 national phase application of PCT/NL2012/050629(WO 2014/038930), filed on Sep. 7, 2012, entitled "Cattle Floor", which is incorporated herein by reference in its entirety.

The invention relates to a floor for animals such as cattle. The invention further relates to a living area for animals, such as cattle. The invention further relates to a method for keeping animals, such as cattle.

It is known in the art to keep animals, especially cattle in stables on concrete floor, comprising gutters or the same for collecting animal excrements such as manure and/or urine. These gutters have to be cleaned periodically, which is time consuming, cumbersome and may moreover provide for a sub optimal living environment for the animals and their keepers. Moreover a concrete floor may not be comfortable for the animals to stand on and especially to lie on.

In order to reduce the problems of these known floors it is known to provide grates or the like in the floor, opening into a cellar space for collecting the excrements. The cellars will be emptied and cleaned regularly, in order to prevent undesirable influences of the excrements in the living environment in the stables. Moreover the floor is still to be cleaned regularly using hand tools or the like and is uncomfortable to the animals.

In NL 1015343 a floor for keeping animals is disclosed, comprising slits in the floor, extending over a cellar space. Urine can flow from the floor into these slits to be received in the caller space. Alongside the floor a manure grid can be provided for allowing manure to pass into a further cellar below it. On the floor ridges can be provided, extending perpendicular to the slits, forming small gutters in between them for receiving and guiding urine to the slits. A scraper can be provided on top of the floor, having a profile fitting over and in between the ridges, for scraping manure from the floor onto the manure grid. This floor allows manure and fluids such as urine to be separately collected but still provides for little comfort to the animals and people working in the vicinity. Moreover, the floor is time consuming and costly to build and maintain.

In the publication "De koeientuin" of Courage (Van Kasteren; Juni 2009) a new type of area for keeping cows is described, called a cow garden (Koeientuin). In this disclosure a floor is described which should increase the comfort to the cows by providing, in a existing floor having parallel flat-V-shaped grooves, a drainage layer with a drainage pipe at the bottom of each of the grooves. On the drainage layer a stabilisation layer is provided, which is covered by a relatively soft, pliable top layer over which a cover layer is provided. The stabilisation layer, top layer and cover layer are described as urine permeable, such that the urine of the cows can be received in the drainage layer and can be transported through standard drainage pipes to a urine collecting cellar. Manure can be scraped off the cover layer by a manure robot. The cover layer can be plastic. Although this floor increases the comfort for the cows, it is cumbersome to construct and costly, whereas maintenance may be troublesome.

An aim of the present disclosure is to provide for a floor for animals, as an alternative to existing floors. An aim of the present disclosure is to provide for a floor for animals, such as cattle, which is comfortable to the animals. An aim of the present disclosure is to provide for a floor for animals, such as cattle, which is easy to maintain, especially to clean. An aim of the present disclosure is to provide for a floor for animals, such as cattle, which is suitable for collecting excrements or at least part thereof. An aim of the present disclosure is to provide for a floor for animals, such as cattle, which is suitable for separating fluid portions of the excrements from solids, especially urine from manure. An aim of the present disclosure is to provide for a living area for animals, such as cattle, which has such floor. An aim of the present disclosure is to provide for a method for keeping animals, such as cattle, which improves living circumstances of the animals and working conditions for animal keepers.

At least one of these aims and/or other aims and goals can be achieved with a floor, living area and/or method according to the disclosure.

In an aspect a floor for animals such as cattle, according to this disclosure can be characterised in comprising a base structure and a top layer, wherein the top layer is permeable to fluid portions of animal faeces and/or animal urine, but impermeable to solid parts of the animal faeces. The base structure comprises voids for receiving said fluid portions and/or urine passing through the top layer. The base structure comprises an array of base elements forming a substantially continuous deck supporting the top layer. The deck is arranged for passing said fluids into internal volumes of the base elements forming said voids, the internal volumes of at least a number of said base elements being in fluid communication with each other, preferably such that fluids received in said internal volumes can be removed from the base elements by flow through said internal volumes.

In an aspect an animal living area such as a stable can be characterised by comprising a floor according to this disclosure, wherein animals can live on top of the floor, the floor being suitable for supporting standing and lying animals.

In an aspect a method according to this disclosure can be characterised by animals being held on a floor comprising a top layer provided over a cushioning layer provided on a structure formed from box shaped, substantially hollow plastic base elements. A fluid fraction of the animal excrements and/or urine is allowed to pass through the top layer and cushioning layer into the box shaped elements, wherein a solid fraction of the animal excrements is prevented from passing through said top layer and is collected from the floor by a manure removing system, especially a removal robot.

In further elucidation of the present invention embodiments of the present disclosure, such as embodiments of a floor for keeping animals, a living area for such animals and a method for keeping animals shall be described hereafter, with reference to the drawings. In the description a base element for a floor structure of this disclosure will also be referred to as module.

In this description embodiments of the invention will be described with reference to the drawings by way of example only. These embodiments should by no means be understood as limiting the scope of the disclosure. At least all combinations of elements and features of the embodiments shown are also considered to have been disclosed herein. In this description the same or similar elements and features will be referred to by the same or similar reference signs.

In this description expressions of orientation such as top, bottom, vertical etcetera are used for convenience only and refer to the orientation of the module as seen in the accompanying drawings. Such expressions are not to be regarded as limiting the orientation of the module in use, and indeed, as will be described below, modules according to the description can be used in other orientations, including at least at sloping surfaces, for example such that gravity flow through the modules is possible.

In this description floors and methods will be described with reference to cattle or life stock, such as cows, pigs, chickens or the like animals. The same or similar floors or methods can be used for different animals. A floor structure of this description can be part of a closed stable or the like building, or can be used in a half open or fully open area for keeping animals such as cattle or life stock.

Figure 1:
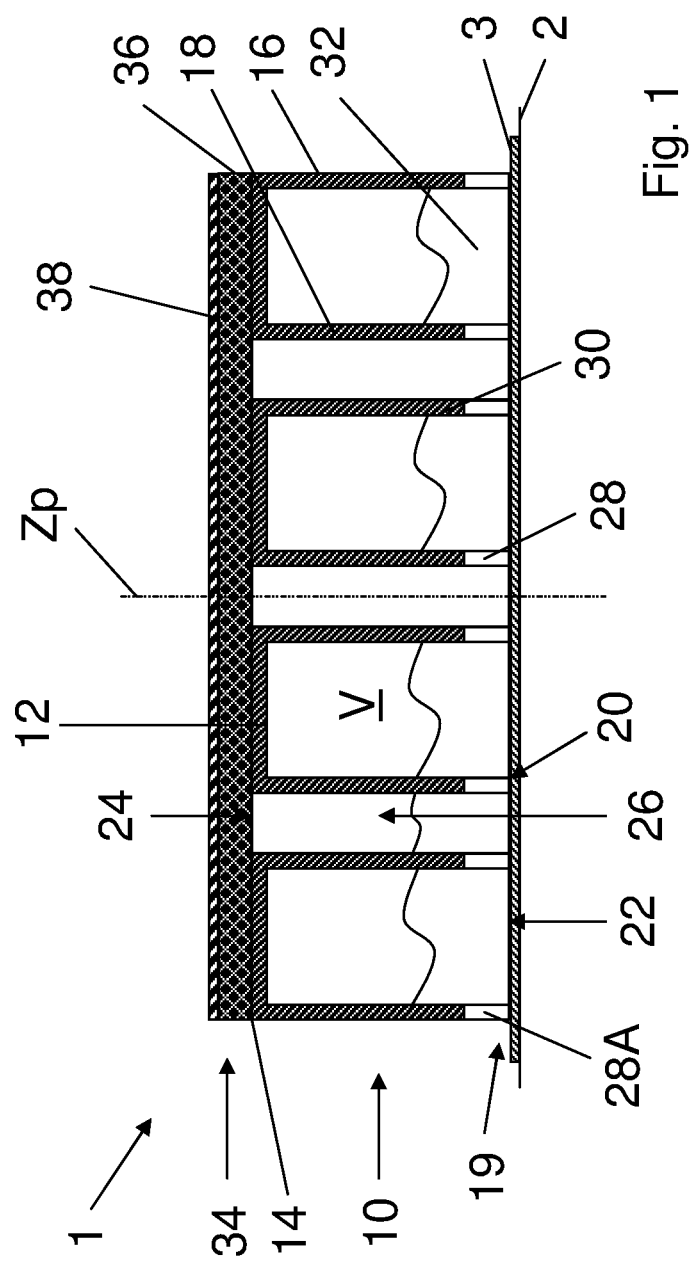
FIG. 1 shows in cross section schematically a floor structure, comprising a base element with a deck and pillars, and a cover.
Figure 2:
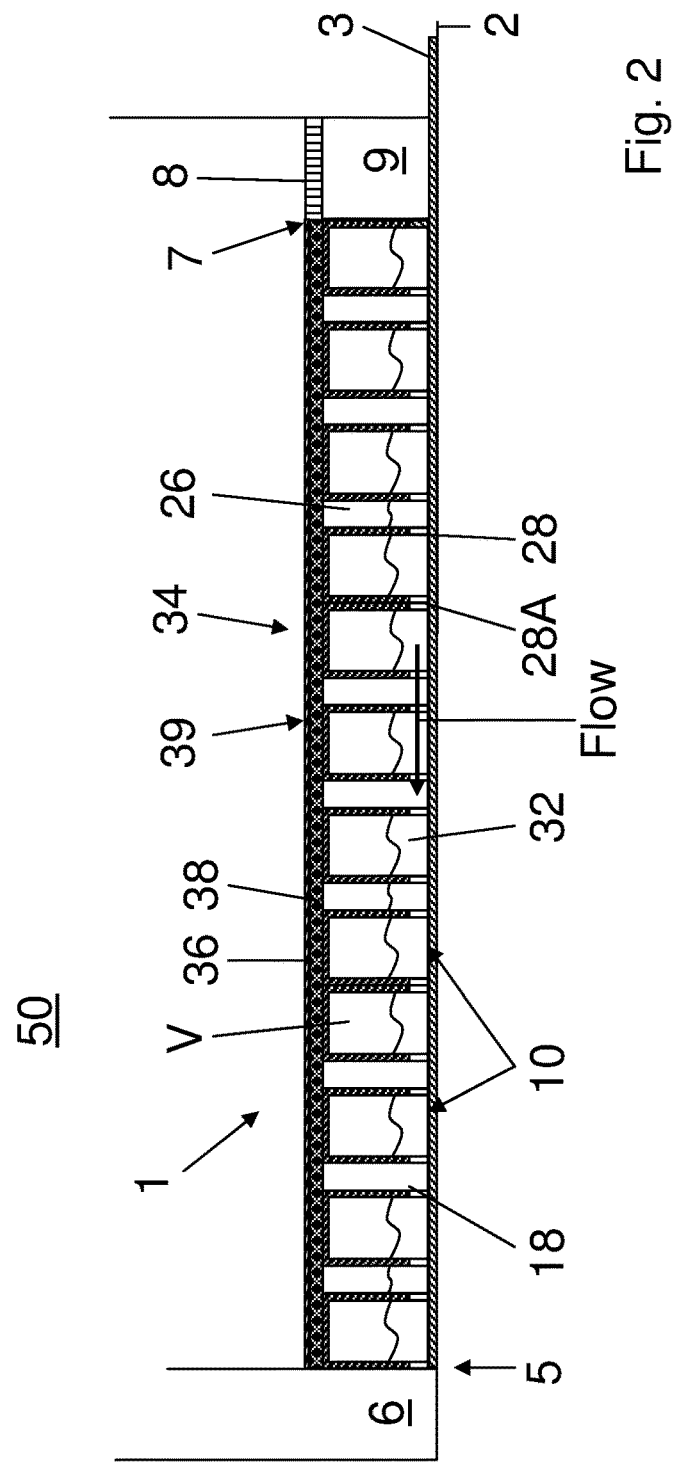
FIG. 2 shows in cross section schematically a series of base elements carrying a top floor.

FIGS. 1 and 2 show schematically in a cross sectional side view a floor 1 according to this disclosure, in a first embodiment, comprising a base element 10 (FIG. 1) or a series of base elements 10, comprising a deck 12 forming a top wall, and can be provided with side walls or a peripheral side wall 16 extending down from a peripheral edge 14 of the deck 12. The deck is carried by a series of pillars 18 extending from the deck 12 downward. The base element or module 10 can be positioned on a substructure 2, such as bed of sand or soil, on a floor such as a concrete floor, or on any suitable substructure, such that lower ends 20 of the pillars 18 and/or the lower ends 19 of the wall or walls 16 rest on the substructure 2 or a layer 3 provided thereon. Preferably both the wall 16 and at least a number of and more preferably all pillars 18 support the module 10 on the substructure, such that a more even distribution of forces between the deck 12 and the substructure 2 is obtained.

In this embodiment the module 10 is largely open at a bottom side 22. On the substructure 2 a layer 3 can be provided, such as for example a sheet of fabric or plastic foil. In embodiments the layer 3 can be a fluid impermeable layer 3, preventing fluids from flowing out of the modules into the substructure 2 or vice versa. In embodiments the layer 3 can be used for preventing movement of the substructure, such as for example preventing erosion of the substructure 2. In embodiments the layer can be provided for covering the substructure 2 in order to prevent the fluids and/or for example acid components of fluids to be received herein to enter into the substructure.

As can be seen in FIGS. 1-7 at least some of the pillars 18, which can also be referred to as columns, can have a substantially open top end 24 in the deck 12. In the embodiment shown it can be seen that the pillars 18 are hollow and form a substantially open channel 26 between the open top end 24 and the lower end 20.

In the embodiments shown the pillars 18 can have any suitable cross section perpendicular to their longitudinal axis Zp, for example but not limited to a circular, square, rectangular or polygonal cross section. The cross section can be substantially the same over the longitudinal length of the pillar, seen along the axis Zp, but the cross section can also vary. The pillar can for example be partly or entirely conical, for example such that it has a draft suitable for injection moulding or a stronger draft. Suitable shapes and dimensions will be directly apparent to the skilled person. The modules 10 are preferably made integrally, including the pillars 18, deck 12 and walls 16, for example by injection moulding. Alternatively they can be assembled from different parts.

The pillars 18 can be provided with one or more opening 28 extending through the wall 30 of the pillar 18, connecting the channel 26 with an internal volume V of the module 10. In this embodiment the internal volume V is enclosed between the deck 12, the side wall or side walls 16 and the substructure 2, between the pillars 18. In the embodiment shown in FIGS. 1, 2, 3 and 7 the openings 28 are shown near or at the lower ends 20, close to or directly adjacent the substructure 2. However openings 28 can be provided in any suitable position, for example at different longitudinal positions between the lower en top ends 20, 24. Similar openings 28A can be provided in the side wall or peripheral wall 16. Such additional openings 28A can also be provided at different positions along the wall or walls 16, for example at different heights.

In FIGS. 1 and 2 schematically a volume or body of liquid 32 is shown in the internal volume V of the module 10, which shall be discussed further on in this description. The substructure 2 and/or the layer 3 can at least partly close off the open bottom side 22 of the module 10, such that the body of liquid 32 can be retained inside the internal volume V. In such embodiments the internal volumes V of adjacent modules 10 can be in communication with each other, for example through the openings 28A in the walls 16, such that these internal volumes V effectively form an integrated internal volume. This can be beneficial for obtaining a desired distribution of liquid through an array of such modules 10, as will be explained. In embodiments the substructure 2 slopes slightly towards a low side 5, such that within the internal volume V or joined volume V of the modules 10 a gravity induced flow of the liquid can be obtained towards the low side 5. At or along the low side 5 a gutter or such channel 6 can be provided for removing the liquid from the floor structure 1. The liquid can for example be pumped from the volume or volumes V and/or from the channel 6, in a known manner, to be disposed off. In embodiments a water supply can be connected to the internal volume V or joined internal volumes V for flushing out the liquid from the modules 10.

As can be seen in FIGS. 1, 2, 3 and 7 a top floor 34 is placed on top of the deck 12, covering the deck 12 at least partly and preferably entirely. The top floor 34 comprises at least a first layer 36 and a second layer 38 covering the first layer 34 and the modules 10. In the embodiments shown the second layer 38 forms a top layer, forming a surface 39 for supporting animals 41, people and devices, such as cleaning tools, for example a manure robot 40. The top floor 34 is preferably permeable for liquid fractions of animal excrements, such as urine, whereas it is impermeable for a solid fraction of animal excrements, such as manure, and also for example for animal feed such as straw. Such top floor is in essence also described in the publication "De Koeientuin" as mentioned here before.

The first layer 36 can be relatively soft and pliable, though providing for sufficient support to the animals 41 walking on or over the surface 39 or lying down on it, and for supporting people and machines such as but not limited to a robot 40, wheelbarrows, feed carts or the like. In embodiments the first layer 36 can be an insulating layer, for example made of open cell foam, fibre material, open cell structures plastic, or plastics or rubber material comprising channels extending there through, from the top layer 38 to the top deck 12 The first layer 36 can be provided as tiles, strips, foil from a roll, sheet or any such suitable shape or configuration, can be pre-formed or made into a desired shape or configuration in situ, or can be formed on top of the top deck 12 of the modules 10, for example by foaming on top of the deck 12. Especially in the latter case, but possibly also in other configurations, between the first layer 36 and the top deck 12 an intermediate layer 33 can be provided, for example a foil or membrane, permeable to at least the fluid fraction of animal excrements. The intermediate layer 33 can for example be a perforated foil. Preferably such intermediate layer 33 is not to be used.

The first layer 36 can be a pressed, water permeable foam layer. This first layer 36 can be made of any suitable material, for example foamed PP, PE. PET, PS, elastomer or rubber or compounds, such as combinations of the materials mentioned and/or other components. A foaming agent can have been added during manufacturing. The foam preferably has an open cell structure.

The second layer 38 can be made of a plastic or rubber material, and can for example be a film or foil, preferably extending over the entire surface 39. More preferably the second layer 38 is provided over the first layer 36 without seems or the like connections in the surface. The second layer 38 can have a thickness $t_2$ which can be smaller than the thickness $t_1$ of the first layer 36. The second layer 38 can for example be pulled taut over the surface, for example stretched over said surface 39. The surface 39 is preferably smooth, such that a solid fraction of animal excrement such as manure can easily be removed. Preferably such that the solid fraction can easily be pushed and/or scraped and/or sucked and/or flushed off the surface 39, more preferably without smearing. The second layer 38 can be an artificial layer, for example a woven or non woven material. The second layer 38 can be a woven or non woven geotextile, such as for example a geotextile marketed as (Ten Cate) Polyfelt® by Ten Cate BV, The Netherlands, such as but not limited a Polyfelt® non-woven or woven geotextile, for example made of plastics such as PE, PET, PP or any other suitable material or blend of materials. The second layer preferably is robust, suitable for supporting a cleaning robot such as a manure robot on top of it, has a very limited to no stretch, preferably below about 30%, more preferably below 20%, more preferably below 15% and even more preferably about 10% or less (EN ISO 10319). The second layer 36 should preferably be permeable to and/or resistant for fluid fractions of human and/or animal excrements and urine, sweat and the like.

If a third layer 33 is used this can be a (geo)textile or geotextile or a scattered layer of for example chips or fibres, which can for example by impregnated, for example with anti bacterial and/or anti fungal components.

Figure 7:
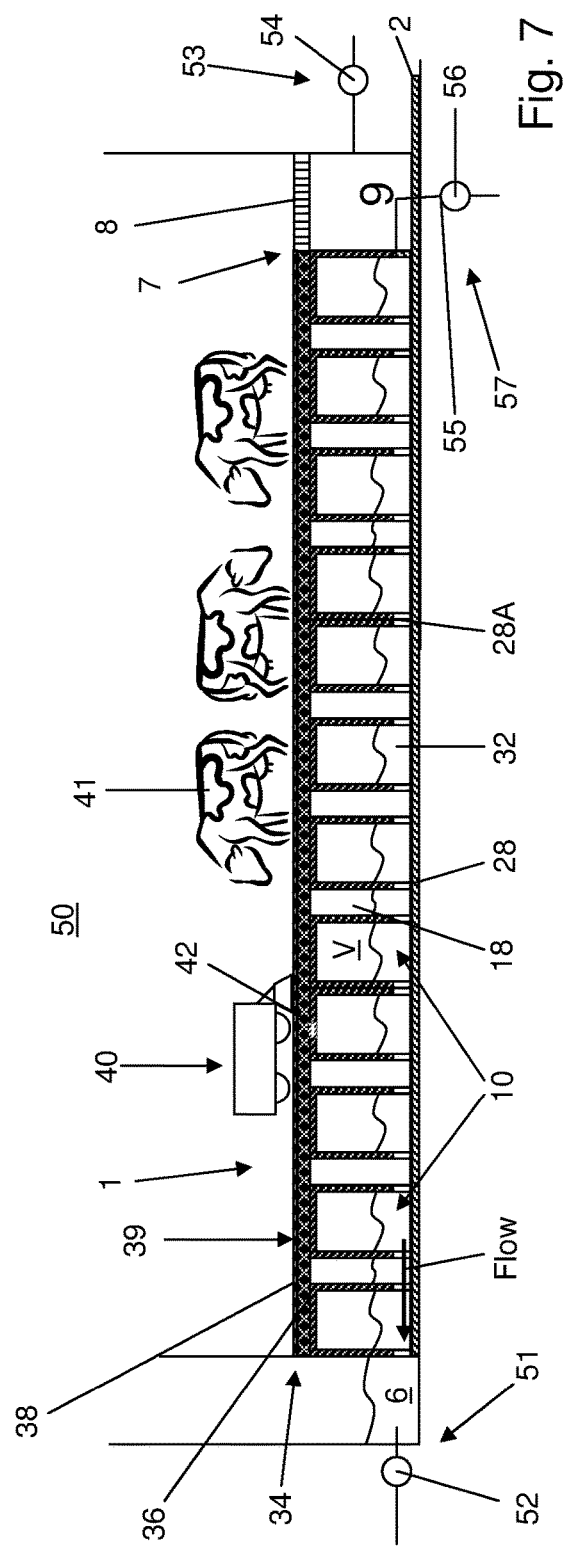
FIG. 7 shows schematically in cross sectional view a floor with animals and a robot on top.

As can be seen in FIGS. 2 and 7, the floor structure 1 can be provided, for example along one or more sides 7 and/or in a more central position, with one or more manure grids 8 or other covers extending over an entrance to a manure disposal system, such as a manure cellar 9, which can be of a known construction. The solid fraction of animal excrement, such as manure, and possibly other solid on the surface 39 can be easily pushed or otherwise furthered into the manure disposal system through the manure grids 8. A manure robot 40 can for example be used. In other embodiments different means for removing the solid fraction can be used, alternatively and/or in addition to such robot 40.

The first and second layer 36, 38 can be separate layers or can be provided as an integral top floor performing the desired functions, for example as one substrate preforming both the functions of insulating and/or cushioning and forming a smooth surface, or as a multi-layer foil or film, comprising both or all layers 36, 38 and/or 33.

The deck 12 can be provided with additional openings 42 extending into the internal volume V, such that liquid can pass through the top floor 34 and the openings 42 into the internal volume V of the modules 10, to be retained therein or to flow away.

Figure 6:
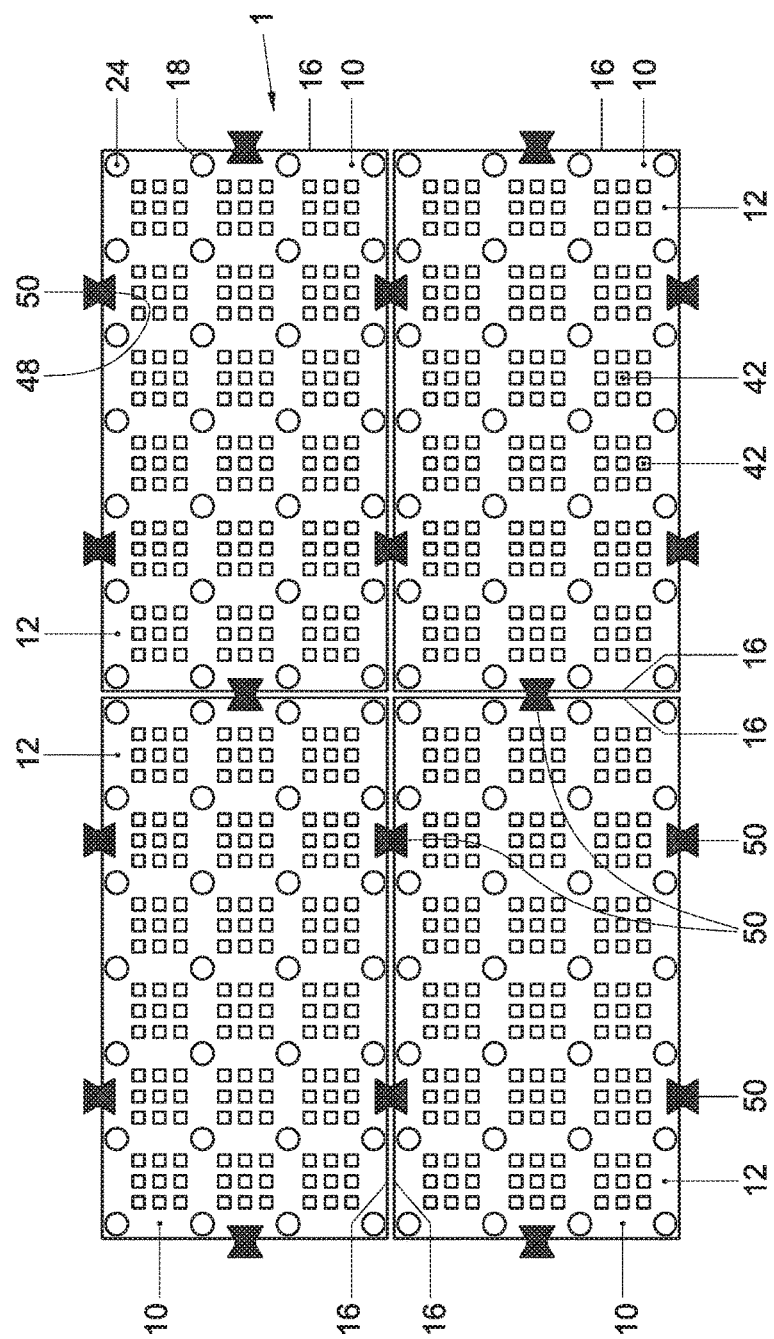
FIG. 6 shows schematically in top view a series of modules interconnected.

In FIG. 2 a series of modules 10 is shown, interconnected in a suitable way, for forming a larger area suitable for supporting animals 41. The decks 12 of the modules 10 preferably form a substantially flat or continuous surface area, and are covered by the top floor 34 extending over the series of modules 10. The modules 10 can be arranged in a matrix of rows and columns, as is for example shown in top view in FIG. 6 showing four modules 10, for covering any size and/or shape area. As discussed the internal volume V can be a continuous volume throughout the area or part thereof. Alternatively modules 10 could be provided with closed peripheral walls, that is free of openings 28A or such openings blocked, such that some or all of the rows and/or columns of modules have their own closed internal volume V.

Figure 3:
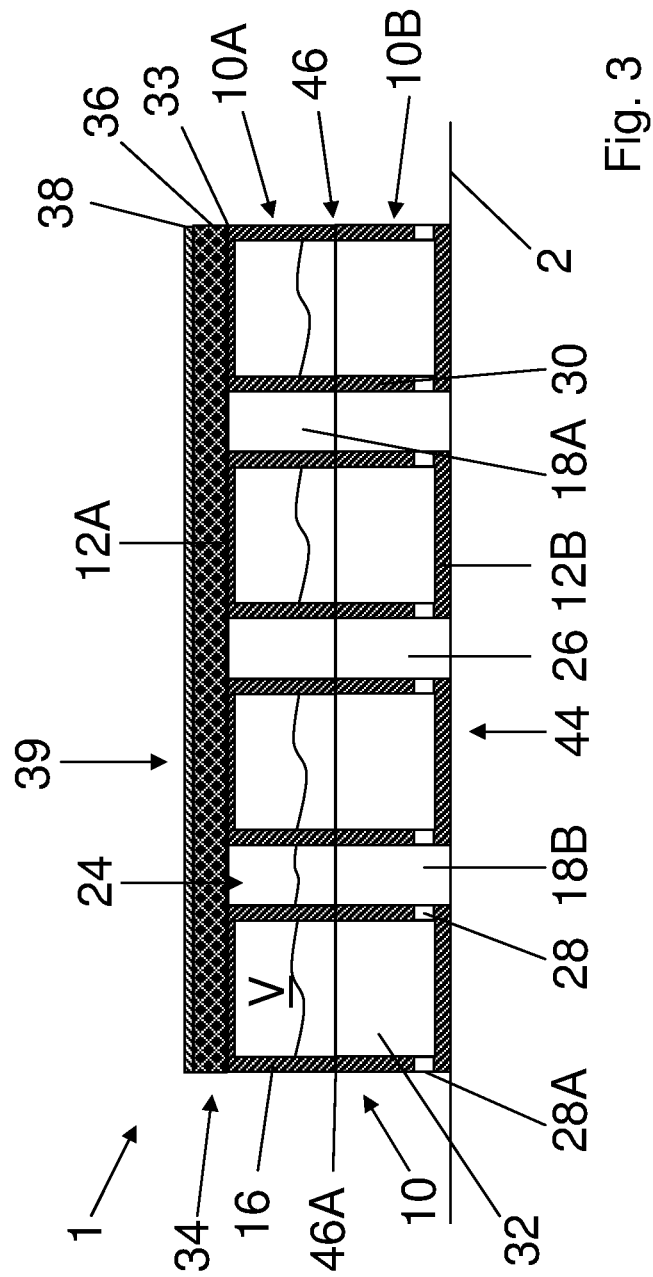
FIG. 3 shows in cross section schematically an alternative embodiment of a floor, wherein the base element comprises or is formed as a substantially box shaped module with an internal volume for retaining fluid fraction.

In FIG. 3 schematically an alternative embodiment is shown, wherein the module or base element 10 is box shaped. In general this can be understood as that the module 10 is comparable to that as shown in FIG. 1, but is provided at the bottom side 22 with a bottom 44. This could be a bottom element attached to the bottom 22 of the module 10 as disclosed and discussed with reference to FIGS. 1 and 2. In the embodiment shown in FIG. 3 the module 10 is formed by connecting two module parts 10A, 10B over a connecting area 46 indicated in FIG. 3 by the line 46A. This connection can be made in any suitable way, either permanently or reversibly. The connection can for example be made by welding, gluing, clicking press fitting, screwing or any other suitable way known to the person skilled in the art. In the embodiment of FIG. 3 each part 10A, B comprises a part of a side or peripheral wall 16 and part of the pillars 18. The lower part 10B comprises a bottom 12B, similar to the deck 12, such that the module can be placed on a substructure supported at least largely by the bottom 12B. The module parts 10A, B can be identical.

In embodiments internally the module 10 can contain pillars 18 extending vertically between the deck and bottom 12, 12B which can aid in resisting vertical deformation or crushing of the module 10. In embodiments the module 10 can be assembled from two substantially identical integral components 10A, 10B moulded from a rigid plastics material and which are fitted one inverted on top of the other. Each pillar 18 thus comprises two half-pillars or male and female parts 18A, 18B respectively, one part being integral with one component 10A or 10B and the other part being integral with the other component 10A or 10B. In embodiments male parts 18A can alternate with female parts 18B in each component 10A and 10B such that when the two components are fitted together the male parts 18A of each component enter the respective female parts 18B of the other component to form the complete pillars 18. To avoid over insertion of the male parts into the female parts, and to maintain the top and bottom walls 12 and 14 at their correct separation, each male part can for example comprise a shoulder which abuts against the open end of the respective female part when the components 10A and 10B are fully engaged.

Figure 4:
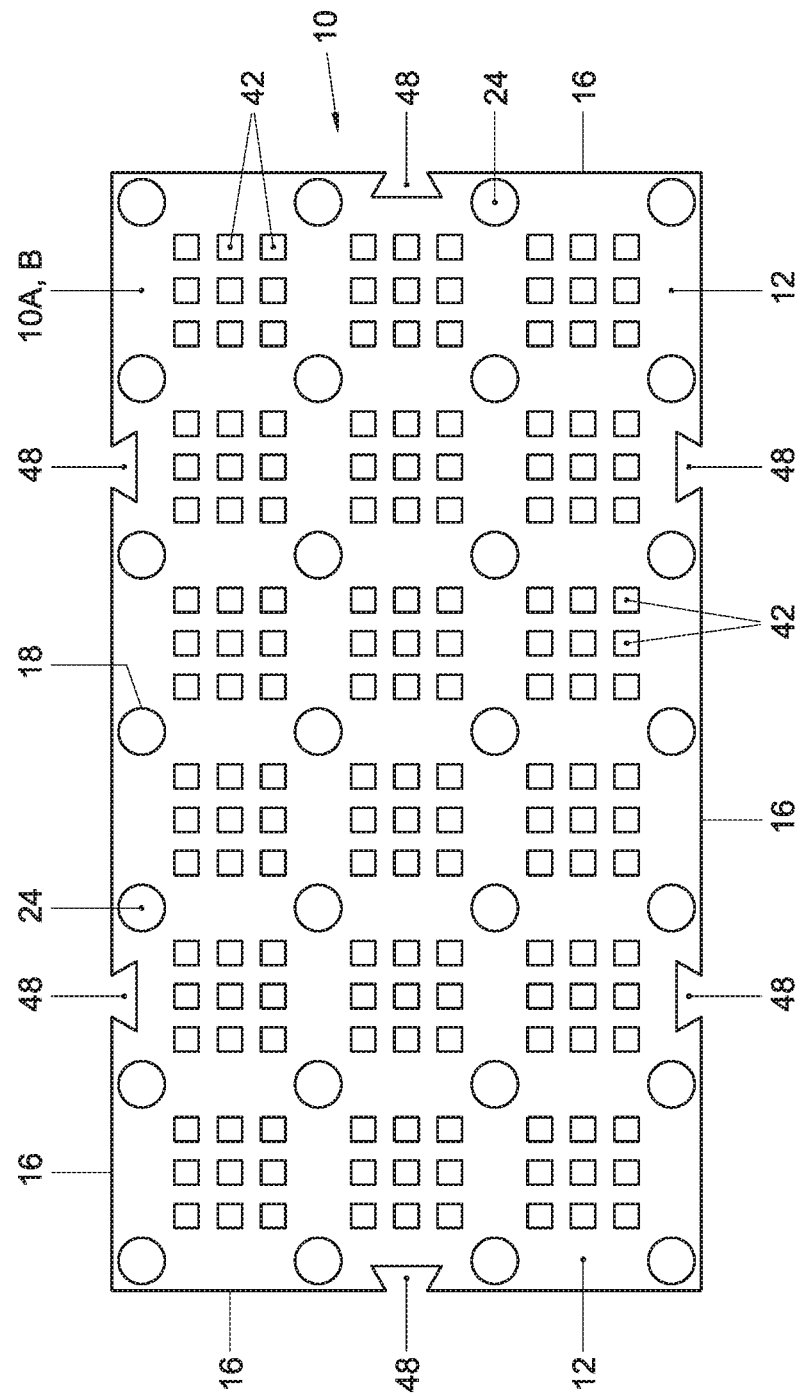
FIG. 4 shows schematically in top view a base element, in a first embodiment.

As shown in FIG. 4 the deck 12 and, if applicable, the bottom 12A of a module 10 can be formed by a sustainably closed plane comprising the openings 42 and open ends 24 of the pillars 18. In this embodiment the openings 42 have a substantially square cross section, but they can have any cross section desired, such as but not limited to round, oblong, polygonal or the like.

Figure 5:
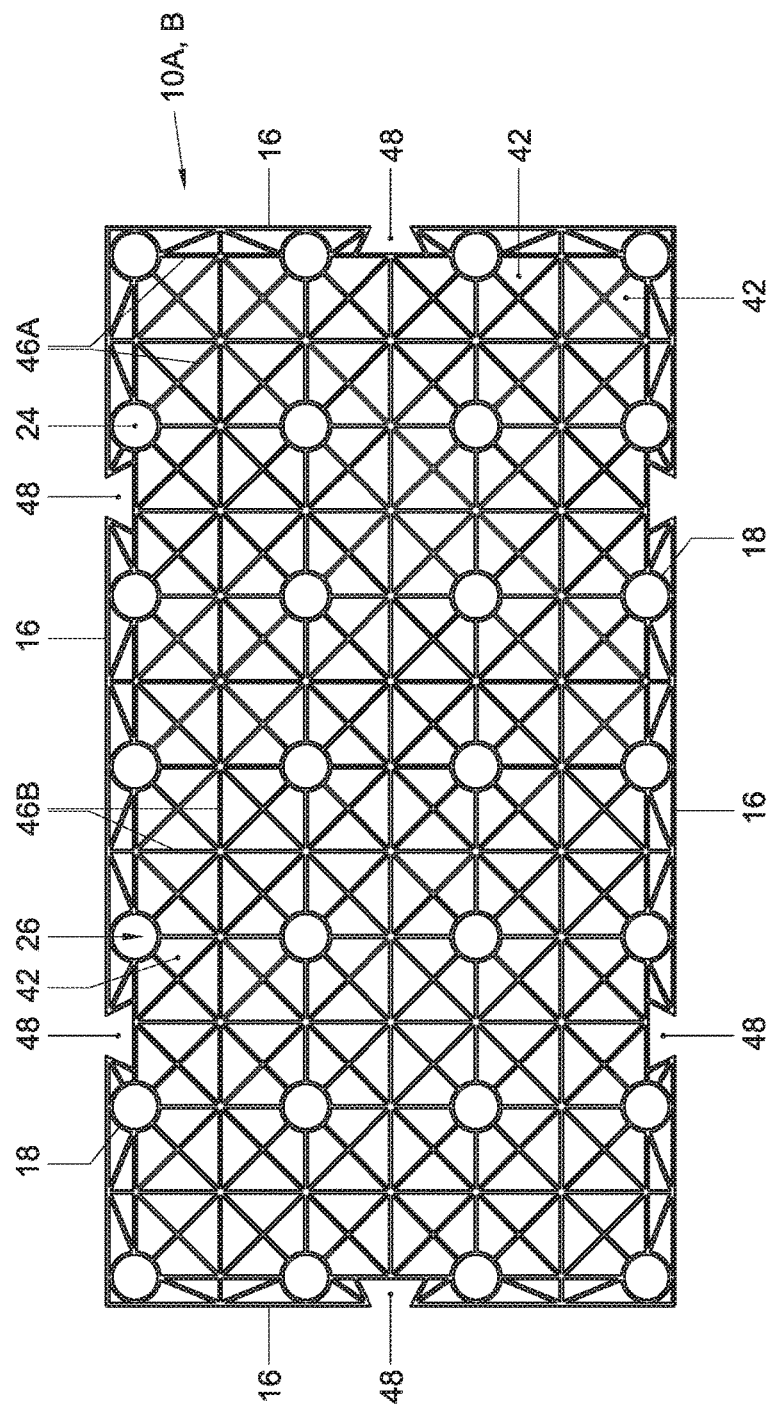
FIG. 5 shows schematically in top view a base element, in a second embodiment.

In FIG. 5 an alternative embodiment is shown, wherein the deck 12 and, if applicable, the bottom 12A can be formed substantially open. The deck 12 and/or bottom 12A can be formed substantially by a structure of intersecting ribs 46A, B extending between at least open ends 24 of pillars 18 and between open ends 24 of pillars and side walls 16 of the base element 10, and/or between other ribs.

In embodiments the bottom 12B can be according to FIG. 4 and the deck 12 could be according to FIG. 5 or vice versa.

As can be seen in FIGS. 4, 5 and 6 the module 10 can be provided with side wall channels 48, extending over part or all of the height of the module 10 or a module part 10A, which can have a cross section non-releasing in the direction of the relevant side 16 of the module. In the embodiment shown the side wall channels 48 have a substantially dove tail shape cross section. When two modules are appropriately placed next to each other, side walls 16 facing and abutting, at least two such side wall channels 48 will be adjacent to each other and open to each other, forming a substantially bow-tie or butterfly shaped joined channel. A locking element 50 having a shape complementary to the joined channels 48 can be press fit into said joined channels 48, locking the modules to each other. As can be seen several such channels 48 can be provided on all sides of the modules 10, assuring a very firm connection between all modules. Obviously other such locking elements 50 and complementary channels 48 could be provided or other means for coupling the modules.

The modules 10 can contain a network of bracing members to resist geometric deformation of the module in a horizontal plane and/or in vertical direction. The bracing members can for example be formed by the ribs 46A, B as shown in FIG. 5 and/or extend in a pattern as shown in FIG. 5, and can be internal within the internal volume of the module, for example below a deck 12 as shown in FIG. 4. The ribs 46A can for example extend parallel to a side wall or diagonally between pillars 18 and can comprise or form vertical webs having apertures to allow fluid flow horizontally through the module 10 in any direction. The webs can be orientated vertically such that they do not obstruct fluid flow in the vertical direction. Each rib and/or web can be formed of upper and lower halves integral with upper and lower components 10A, 10B respectively, and can have facing non-straight or at least not completely connecting edges, such as for example concave or wavy edges defining apertures between them. In embodiments the edges can be parabolic. Between the ribs 46A and/or webs further ribs 46B can be provided, which can also form or comprise webs extending into the inner volume V and can serve to break down voids within the volume V. As viewed from above in FIG. 5, they can extend substantially normally between the bracing ribs 46A and supplement the bracing effect of the latter. By way of example and not limiting the disclosure, in embodiments the ribs 46A, B can for example be a few millimeters thick, for example about 5 mm thick and can extend downward or upward from the deck 12 or bottom 12B in a direction normal to the page a few millimeters to several centimeters and can bridge about all of the internal height of the module.

In general modules can be used as disclosed as structural modules in for example WO0214608, WO2011/007128 or WO2011/007127, all of which are considered to have been incorporated herein in their entirety as published, as far as the detailed description and the drawings are concerned.

In FIG. 7 a series of modules 10 in forming a floor structure 1 is shown, schematically in a stable or such animal, especially cattle farming area 50. Again obviously this can be a matrix of modules 10, forming a large animal support area. In this embodiment the modules can be as described before. In the embodiment shown the animals are cows 41. Obviously other animals could be kept in the same or a similar floor structure 1. In the embodiment shown modules 10 according to FIGS. 1 and 2 are shown. However, also such floor structure 1 comprising modules according to FIG. 3 re considered having been disclosed herein, as well as any other such floor structure comprising modules, as falling within the scope of the appending claims. In this embodiment the floor structure 1 is shown in which the lower end 5 and gutter 6 are shown at a left hand edge of the floor structure, and the manure grid 8 at an opposite extreme side 7 of the floor structure. Obviously this is by way of example only Different positions thereof are obviously possible, for example a gutter 6 and grid 8 adjacent or even partly above each other. In this embodiment the surface 39 spans substantially the entire width of the stable 50 in which the animals 41 will be kept. It is however also possible to provide a smaller area with such floor structure, for example if the animals 41 are only kept in a restricted area within the stable 50. In this embodiment schematically a urine disposal system 51 is shown, indicated by a pump 52 for pumping or sucking the urine from the gutter or reservoir 6. Similarly a manure disposal system 53 is schematically shown, connected to the cellar 9, for removing the manure there from, schematically represented by a further pump 54. Moreover a pipe 55 and further pump 56 are shown as schematically representing a fluid dispensing system 57 for feeding a rinsing or cleaning fluid or the like to the internal volume V, preferably at a side spaced apart from the lower end 5. The systems 51, 53 and 57 are all optional and can be left out or combined in any suitable way or configuration.

Floor structures and animal keeping areas according to the disclosure can have the advantage that loads and forces provided on top thereof are distributed over relatively large areas, allowing higher loads and forces without becoming unlevel or uneven. A structure or surface area of the disclosure can provide for suitable and substantially constant removal of urine and easy and effective disposal of manure. A structure or surface area according to the disclosure can have the advantage that a substructure can be protected, and that n animal keeping surface area can be provided on substantially all kinds of substructures, permanently or temporarily. A structure or surface area according to the disclosure can have the advantage that the base element or module can provide for flexibility and/or damping for for example people or animals trafficking the area. Structures or surface areas according to the disclosure can have the advantage that they can be formed quickly. In floor structures or surface areas according to the description modules can be used which are prefabricated with for example the first layer 36 provided on top of the deck 12 or integrated therewith, for example by foaming the deck 12. In a floor structure according to the disclosure parts of the top layer can be made differently from other parts. For example in one or more areas a first layer can be used which is softer than in other areas, for example for forming areas in which the animals can lie down. In such areas also the first layer could be made with a higher thermal insulation factor. In embodiments the second layer could be made from a different material than in other areas. For example in some areas the second layer can be made of a harder or tougher material, for example in areas where animals and/or people and/or machines impact the surface 39 more severely.

Obviously the choice for materials, pliability, tensile strength, hardnesses, flexibility, chemical and mechanical resistance, fluid permeability and the like can be made depending on for example the type of animals to be kept on the floor structure, the intensity of use, type of cleaning desired and the like. This shall be directly clear to the person skilled in the art and all possible combinations and permutations are considered to have been disclosed herein.

The present invention is by no means limited to the embodiments specifically disclosed in the drawings and description. Many variations are possible within the scope as defined by the claims For example all combinations of parts of the embodiments shown in the drawings are considered to have been disclosed too. Base elements or modules as disclosed can be made by any methods and from different materials. Modules can be coupled in different manners and different ways or can be placed next to each other without coupling. They can be positioned in different orientations relative to each other, for example in a "half-stone" relationship for even more rigid connections. Modules can be stacked for obtaining a larger internal volume V in the structure. The modules can have different shapes and dimensions, for example polygonal. Preferably they can be coupled such that they can form a substantially continuous surface area. These and many such variations are considered falling within the scope of the claims.

The invention claimed is:

1. A floor comprising a base structure and a top layer, wherein the base structure comprises an array of base elements forming a substantially continuous deck supporting the top layer, wherein the deck is arranged for passing fluid portions of animal feces and/or animal urine into internal volumes of the base elements forming said voids, the internal volumes of at least a number of said base elements being in fluid communication with each other, such that said fluid portions received in said internal volumes can be removed from the base elements by flow through said internal volumes, and a flushing device, located below the top layer, for flushing a fluid and/or gas through said internal volumes, wherein the floor is a floor for animals, wherein the top layer is permeable to said fluid portions of animal feces and/or animal urine, but impermeable to solid parts of the animal feces, wherein the base structure comprises voids for receiving said fluid portions and/or urine passing through the top layer, wherein the floor is adapted for removal of fluid portions of animal feces and/or animal urine and wherein a cleaning device is provided on said floor for collecting manure or dung from said floor.

2. The floor according to claim 1, wherein between the substantially continuous deck and the top layer at least one intermediate layer is provided, permeable to fluid portions of animal feces and/or animal urine, which at least one intermediate layer is a cushioning layer, wherein the at least one intermediate layer is made of an integral layer of material, and wherein the at least one intermediate layer is more pliable than a material of the deck.

3. The floor according to claim 1, wherein the top layer has a substantially flat and smooth surface, provided taut over said deck.

4. The floor according to claim 1, wherein the base elements comprise a deck and a bottom, interconnected by at least an array of pillars, wherein at least the deck is provided with openings for passing said fluids.

5. The floor according to claim 1, wherein the base elements are substantially box shaped modules, having peripheral walls, extending from an edge portion of the deck and/or from an edge portion of the bottom, wherein the peripheral walls are provided with communicating openings.

6. The floor according to claim 1, wherein the base elements are placed on top of a substructure, which is fluid tight, wherein the top layer is flat and wherein the substructure at least partly slopes underneath the flat top layer towards a storage and/or transport facility.

7. The floor according to claim 1, wherein the base elements are made of plastic material.

8. The floor according to claim 1, wherein the base elements are interconnected, forming a substantially rigid structure.

9. The floor according to claim 1, wherein the top layer comprises at least one of a plastics material or a natural or artificial rubber material.

10. An animal living area comprising a floor according to claim 1, wherein animals can live on top of the floor, the floor being suitable for supporting standing and lying animals.

11. The animal living area according to claim 10, wherein the living area is divided in at least two separate areas, wherein at least one gate is provided between the living areas for bringing animals from one living area to another, such that one living area can be cleaned when the animals are brought into another living area.

12. The animal living area of claim 10, wherein the cleaning device comprises a cleaning robot.

13. A floor according to claim 1, wherein the top layer is formed by a film or foil.

14. A method for keeping animals, comprising:
providing a floor for animals comprising a top layer provided over a cushioning layer provided on a structure formed from box shaped, substantially hollow plastic base elements, wherein the floor is adapted for removal of fluid portions of animal feces and/or animal urine;
passing a fluid fraction of animal excrements and/or urine through the top layer and cushioning layer into the box shaped elements;
preventing a solid fraction of the animal excrements from passing through said top layer;
collecting the solid fraction of the animal excrements from the floor by means for removing manure;
providing a flushing device, located below the top layer, for flushing a fluid and/or gas through said internal volumes; and
flushing, with the flushing device, the fluid fraction and/or urine from said box shaped elements.

15. The method according to claim 14, wherein the fluid and the solid fractions are collected separate from each other.

16. The method according to claim 14, wherein the means for removing manure comprises a removal robot.

17. A floor comprising a base structure and a top layer, wherein the base structure comprises an array of base elements forming a substantially continuous deck supporting the top layer, wherein the deck is arranged for passing fluid portions of animal feces and/or animal urine into internal volumes of the base elements forming said voids, the internal volumes of at least a number of said base elements being in fluid communication with each other, wherein the top layer is formed using a film and/or foil on which animals can stand and lie, wherein the floor is a floor for the animals, wherein the top layer is permeable to fluid portions of animal feces and/or animal urine, but impermeable to solid parts of the animal feces, wherein the base structure comprises voids for receiving said fluid portions and/or urine passing through the top layer, and wherein the floor is adapted for removal of fluid portions of animal feces and/or animal urine.

18. A floor of claim 17, wherein the film or foil is taut.

19. A floor of claim 17, wherein at least one intermediate layer is provided between the top layer and the deck, and wherein the intermediate layer is made of an integral layer of material, and wherein the at least one intermediate layer is more pliable than a material of the deck.

20. A floor according to claim 19, wherein the said at least one intermediate layer is made of at least one of an open cell foam, fibre material elastomer, rubber, or a combination of at least two or more of these materials.

21. A floor according to claim 19, wherein the at least one intermediate layer is a heat insulating layer.

22. A floor according to claim 19, wherein at least one intermediate layer is provided which has been impregnated.

23. A floor according to claim 17, wherein the top layer is made of a plastic foil and/or film or rubber foil and/or film or combinations thereof.

24. A floor according to claim 17, wherein the foil or film forms the surface of the floor without seams in said surface.

25. A floor for animals, comprising a base structure and a top layer, wherein the top layer is permeable to fluid portions of animal feces and/or animal urine, but impermeable to solid parts of the animal feces, wherein the base structure comprises voids for receiving said fluid portions and/or urine passing through the top layer, wherein the base structure comprises an array of base elements forming a substantially continuous deck supporting the top layer, wherein the deck is arranged for passing said fluids into internal volumes of the base elements forming said voids, the internal volumes of at least a number of said base elements being in fluid communication with each other, wherein the top layer is formed from at least one of a film or foil, wherein the floor is adapted for removal of fluid portions of animal feces and/or animal urine.

26. A floor according to claim 25, wherein the top layer is made of a geo-textile.

27. A floor according to claim 26, wherein the top layer is made of a woven or a non-woven geo-textile.

28. A floor according to claim 25, wherein the top layer has a stretch below 30%.

29. A floor according to claim 28, wherein the top layer has a stretch below 20%.

30. A floor according to claim 28, wherein the top layer has a stretch below 15%.

31. A floor according to claim 28, wherein the top layer has a stretch below 10%.

32. A floor according to claim 22, wherein the said at least one intermediate layer has been impregnated with anti-bacterial and/or anti-fungal components.

33. A method for using a floor, comprising:
providing a base structure and a top layer, wherein the base structure comprises an array of base elements forming a substantially continuous deck supporting the top layer, wherein the deck is arranged for passing fluids into internal volumes of the base elements forming voids, the internal volumes of at least a number of said base elements being in fluid communication with each other, such that fluids received in said internal volumes can be removed from the base elements by flow through said internal volumes, wherein the floor is a floor for animals and wherein the top layer is permeable to fluid portions of animal feces and/or animal urine, but impermeable to solid parts of the animal feces, wherein the base structure comprises the voids for receiving said fluid portions and/or urine passing through the top layer, wherein the floor is adapted for removal of fluid portions of animal feces and/or animal urine;
receiving feces and urine from animals on the top-layer;
passing the fluid portion of animal feces and/or urine through the top layer into the voids;
providing a flushing device, located below the top layer, for flushing a fluid and/or gas through said internal volumes;
flushing, with the flushing device, the fluid fraction of animal feces and/or urine from the internal volumes; and
providing a cleaning device on said floor for collecting manure or dung from said floor.

* * * * *